United States Patent [19]

Lynum et al.

[11] Patent Number: 5,989,512
[45] Date of Patent: *Nov. 23, 1999

[54] METHOD AND DEVICE FOR THE PYROLYTIC DECOMPOSITION OF HYDROCARBONS

[75] Inventors: Steinar Lynum, Oslo; Ketil Hox; Jan Hugdahl, both of Trondheim, all of Norway

[73] Assignee: Kvaerner Technology and Research Ltd., London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/454,116

[22] PCT Filed: Dec. 21, 1993

[86] PCT No.: PCT/NO93/00196

§ 371 Date: Jun. 2, 1995

§ 102(e) Date: Jun. 2, 1995

[87] PCT Pub. No.: WO94/14899

PCT Pub. Date: Jul. 7, 1994

[30] Foreign Application Priority Data

Dec. 23, 1992 [NO] Norway .................. 92 5001

[51] Int. Cl.⁶ .................................. C09C 1/48
[52] U.S. Cl. ................. 423/456; 219/121.5; 422/158
[58] Field of Search ................. 423/449.1, 458, 423/456, 450, 457; 219/121.5; 422/158, 156

[56] References Cited

U.S. PATENT DOCUMENTS

| 3,409,403 | 11/1968 | Bjornson et al. | 423/450 |
| 4,818,837 | 4/1989 | Pfender | 219/121.51 |
| 5,039,837 | 8/1991 | Nourbakhsh et al. | 219/121.5 |

FOREIGN PATENT DOCUMENTS

| 0411160 | 2/1991 | European Pat. Off. . |
| 0412265 | 2/1991 | European Pat. Off. . |
| 211457 | 7/1984 | Germany . |
| 292920 | 8/1991 | Germany . |
| 1400266 | 7/1975 | United Kingdom . |
| 1492346 | 11/1977 | United Kingdom . |
| 8906260 | 7/1989 | WIPO . |

*Primary Examiner*—Steven P. Griffin
*Assistant Examiner*—Stuart L. Hendrickson
*Attorney, Agent, or Firm*—W. Warren Taltavull; Farkas & Manelli PLLC

[57] ABSTRACT

In a method for the production of carbon black and hydrogen by means of pyrolysis of hydrocarbons with a plasma torch (3) in a reaction chamber the pressure in the reaction chamber (1), the feed rate for the hydrogen plasma gas and hydrocarbons and the angle of the injection nozzles (2) in the reaction chamber (1) are adjusted in order to establish a reaction zone (5) in the chamber's central area with a location which determines the reaction enthalpy for decomposition of the hydrocarbons into hydrogen and carbon black in order to obtain a desired quality for the carbon part. The enthalpy value is adjusted in a range between 1 and 50 kWh/Nm³ and the temperature in the reaction zone is maintained between 1000° C. and 4000° C.

9 Claims, 4 Drawing Sheets

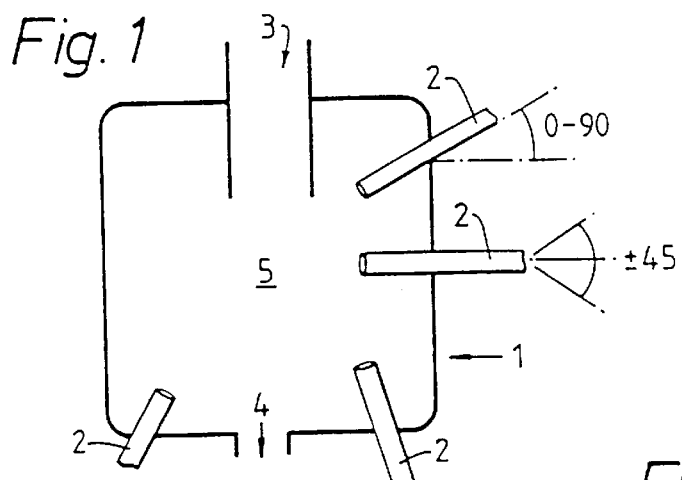
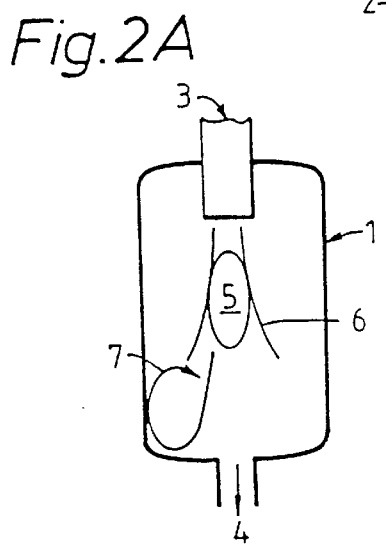
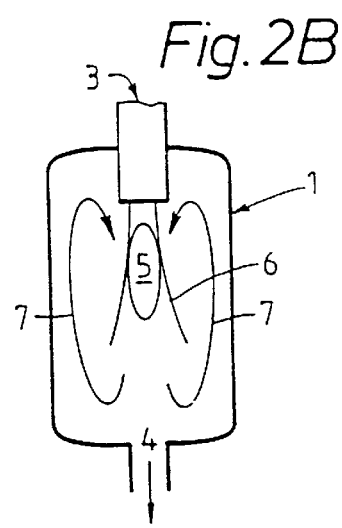
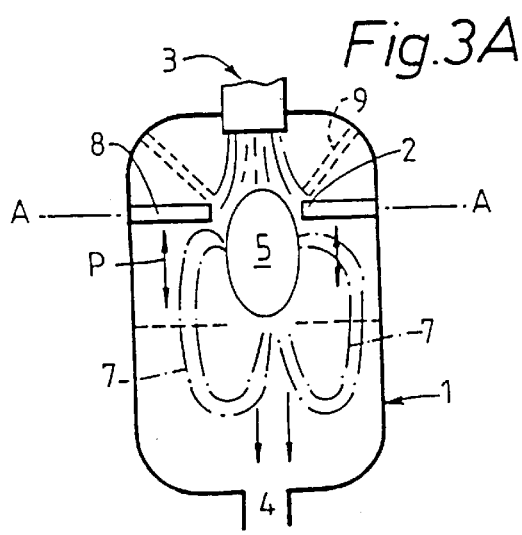
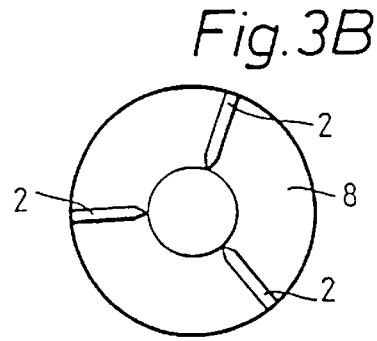

METHOD AND DEVICE FOR THE PYROLYTIC DECOMPOSITION OF HYDROCARBONS

FIELD OF THE INVENTION

The invention concerns a method and a device for controlling the pyrolytic decomposition of hydrocarbons into a carbon part and hydrogen.

BACKGROUND OF THE INVENTION

There are a number of methods and also systems for decomposition of hydrocarbons into a carbon part and hydrogen. The carbon part can thereby be produced in a number of different variants with regard to quality and density. The applicant himself has developed various methods in this connection and reference is made here to, e.g., the applicant's Norwegian patent applications No. 91 4904 and No. 92 1359. These applications concern methods and systems which are intended for continuous production of carbon in the form of carbon black and hydrogen.

From DD 292 920 is known a method for pyrolytic decomposition of hydrocarbons into carbon black and hydrogen with a plasma torch in a reaction chamber. By adjusting the enthalpy value induced into the feed stock in a range between 3 and 8 kWh/kg and the reaction period between 0,1 and 1 sec. one quality of carbon black corresponding to acetylene carbon black is produced.

From DD 211 457 is known a method and an apparatus for the production of carbon black and hydrogen with a plasma torch in a reaction chamber. A part of the hydrogen is recycled and is used as plasma gas. Feed stock in the form of hydrocarbons as liquid or gas is introduced radially via nozzles in one end of the reaction chamber and is mixed into a turbulent flow of plasma gas at a temperature between 3500 K and 4000 K. The reaction chamber is equipped with tempering zones where the reaction products are quenched to a temperature of about 1100 K.

From WO 89/06260 and EP 411 160 are known apparatus for the manufacturing of carbon black by the traditional production method which consists in a combustion of hydrocarbons by the supply of air. The apparatus consist of a combustion chamber, a tapered section and a reaction chamber contiguous to it. The tapered section and the reaction chamber are equipped with supply channels through the walls for introducing the feed stock.

Most of the previously known methods have to be described as discontinuous methods in which the apparatus could only be in operation for short periods of time, or where a further developed product was manufactured from the carbon formed. Alternatively a complete decomposition was not performed, with the result that the end product was not pure carbon together with hydrogen.

The traditional production methods for carbon black in a continuous process have been conducted as a combustion of hydrocarbons by the supply of air. The qualities achieved were dependent on the method in which air or oxygen was supplied, and whether oxygen was used in a surplus or a deficit. The methods were inefficient since substantial parts of the hydrocarbons which were to be converted were used as energy sources for the process, thus obtaining a low utilization factor. In addition the yield was further reduced due to the fact that the combustion process was not complete, thus causing both carbon and nitrogen oxides to be produced. The waste gases from the processes will not be able to be used for any other purpose than as a fuel gas, with the consequent release of polluting environmental gases.

SUMMARY OF THE INVENTION

With regard to the utilization factor of the hydrocarbon feedstock, pyrolysis has proved to be much more effective and a number of experiments have been performed with the utilization of plasma torches. As mentioned in the introduction, however, this has not resulted in any continuous production due to deposits both on the electrodes and in the reaction chamber, which have led to stoppages in the process. Thus for those methods described in the applicant's above-mentioned patent applications, no continuous pyrolytic production process for carbon black has been developed.

In a pyrolytic decomposition of hydrocarbons, however, the quality of the produced carbons will be dependent on the operational parameters. In principle carbon is produced belonging to one of two main groups, viz. either carbon black or carbon black and coke which is also described as pyrolytic carbon. Carbon black is a material with low density and is formed during the gaseous phase at temperatures >700° C., normally higher than 1100° C.

Thus there has been a great need to be able to control such a production process in order that carbon black can be provided with a quality which is defined in advance, i.e. a method which is controllable in such a manner that by means of the method different qualities can be produced according to requirements.

Thus it is an object of the present invention to provide a method and a system which enable a controlled process of this kind to be achieved, either by means of the design of a system and its operation in order to achieve a specific quality, or in order to enable a system to be adjusted in such a way that the system can be converted from the production of one quality to another quality.

A further object of the invention is to permit the production of an end product, which maintains a stable and uniform quality during the entire production process, thus avoiding the production of carbon black with different physical properties.

These objects are achieved with a method and a system which are characterized by the features in the claims presented.

In order for the invention to provide a satisfactory result it is essential that it should also be able to be implemented with the economical use of energy and almost continuously. Care should therefore be taken to ensure that the operating conditions and the design of the system are of such a nature that no obstructing deposits of produced material appear in the reactor and the downstream equipment. At the same time it is important to maintain a defined temperature gradient in the reactor chamber in order to obtain the most uniform quality possible for the product.

By means of the invention it has been found that with an accurate control of the operating conditions in relation to one another and within defined limits, it will be possible to control the method in such a manner that the products which are to be obtained can be defined in advance, while at the same time the product quality is kept at a uniform level. This is achieved simultaneously with an economical implementation of the operation with regard to energy consumption.

By means of the invention the object has been achieved that the production process can be controlled on the basis of a normal feed-stock, such as, e.g., methane, in a simple manner by undertaking an adjustment of the conditions in the actual reaction zone where the actual decomposition takes place. It is not the general conditions in the plant's reaction chamber which are involved here, but in the actual reaction zone, where great difficulty is experienced in performing measurements of the existing conditions. However, if the entire energy relationship and energy consumption in the reaction zone are studied, it will be found that the critical factor for the decomposition process will be the supply and use of energy, i.e. the enthalpy situation which exists in this area. The inventors have recognized this fact and have further realized that it is thereby possible by simple means and based on calculations of those factors which affect the enthalpy value in the area to perform an adjustment and regulation of the decomposition process, in order to obtain the desired product. It has further been discovered that in order to obtain a continuous process, this enthalpy value must be within the values indicated in the patent claims. Furthermore it is essential to be within the temperature range which is necessary for the production of carbon black.

According to the invention there are three principle means which can be used for controlling these enthalpy conditions, viz. the temperature, the pressure in the reaction chamber and the angle of introduction for the feed gases or for feeding in the hydrocarbon. This realization is surprising, but is based on the fact that the reaction zone will be located at different points depending on these conditions and particularly on the feed-in angle of the hydrocarbon stream. A variation of this can be quite simply obtained by adjusting the angle of the injection nozzles, but the variation can also, or in addition to, be varied by altering feed rates.

These reaction parameters can be compared and on this basis a set of parameters can be drawn up which will provide an accurately defined quality for the end product, thereby also determining the efficiency of the process. Thus a simple method is provided for controlling the production of carbon black of a predetermined value in a pyrolytic reactor.

According to the invention the enthalpy in the reaction zone should be between 1 and 50 kW/Nm³/h and preferably between 2 and 20 kW/Nm3/h while at the same time the temperature should be between 1000 and 4000° C., preferably between 1600 and 3000° C.

A device for use in the implementation of the method will comprise a number of elements which are known per se from the applicant's previous applications which were mentioned in the introduction, and will therefore generally comprise a torch which protrudes into a reaction chamber, where in the walls of the reaction chamber there are inlet openings for the supply of extra gases, such as product gas, and where at the other end of the reaction chamber there is an outlet for the products formed, which outlet is connected with a cooling system.

According to the invention the nozzles for the introduction of extra hydrocarbon gas and/or plasma gas are provided adjustably with regard to the angle, at different angles respectively around the combustion chamber. In its simplest form, a system of this kind can be designed with only one permanent set of such nozzles, which are adjusted for one special production. Those parameters required for adjusting the enthalpy value can therefore be simply controlled by means of such a system.

BRIEF DESCRIPTION OF THE DRAWINGS

The invention will now be illustrated in more detail by means of an embodiment and the figures presented in the attached drawings, which include:

FIG. 1 a principle design of a device according to the invention,

FIGS. 2A, 2B two sketches which schematically illustrate the effect of the device's reaction zone, FIGS. 3A, 3B a schematic side view and a section which illustrate an embodiment of the invention, and FIGS. 4–6 examples of simulation curves for use in adjusting parameters which will provide a desired quality for carbon black.

DETAILED DESCRIPTION OF THE INVENTION

Figure 4:
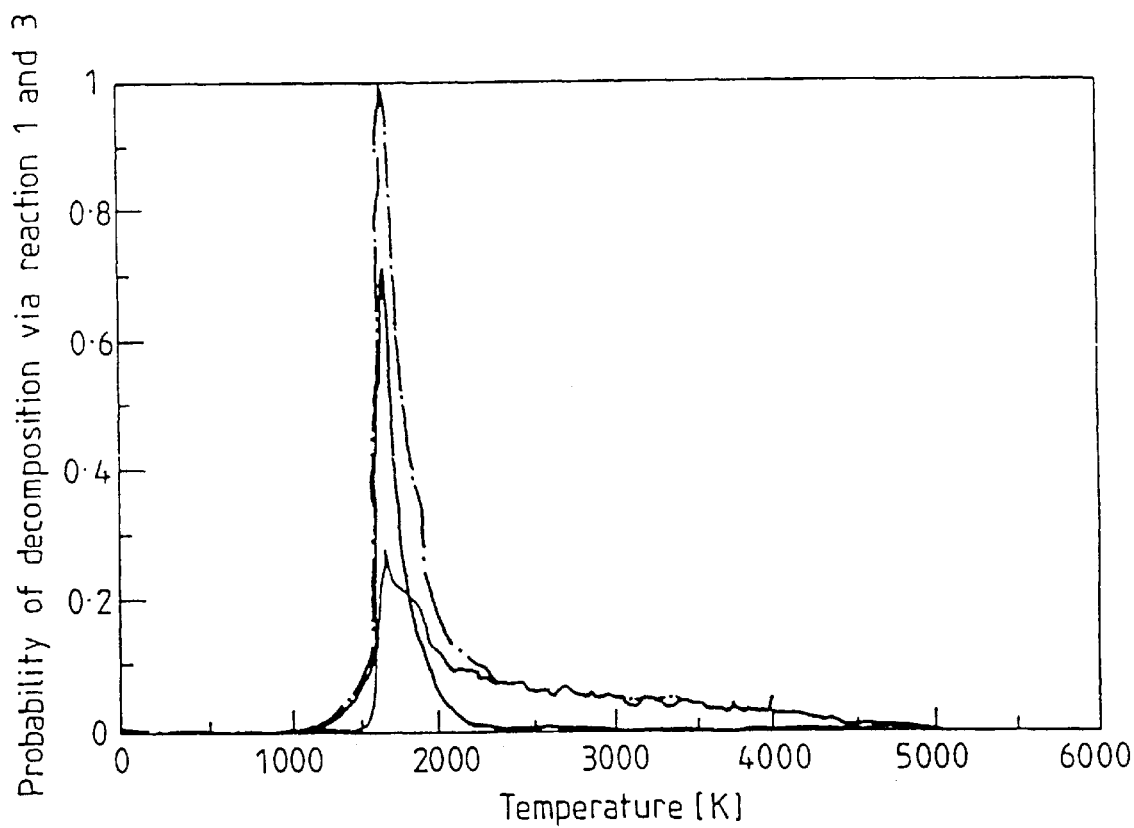

FIG. 1 is a purely schematic illustration of the main principle of the invention. The pyrolytic decomposition of the hydrocarbon takes place in a reaction chamber 1, which is normally of an extended tubular shape, but is here only indicated schematically. Into the combustion chamber there protrudes a torch 3 which is constructed in the normal manner and is operated with, e.g., hydrogen as plasma gas. At the opposite end of the combustion chamber 1 there is an outlet 4 for the products formed. The reference numbers 2 show how the feed ports for hydrocarbons can be provided on the reactor. The number of feed ports around the periphery and on how many levels they should be located is determined by the desired product quality. In order to reduce the number of ports 2 in the side of the reactor while simultaneously avoiding excessively large concentration gradients in the horizontal plane, the side port should/can be able to be rotated at different angles in relation to the horizontal plane.

In a reaction chamber of this type two experiments were performed where hydrocarbon gas was fed into the reaction chamber and into the reaction zone 5 through the feed port at an angle in relation to the center axis in the reaction chamber and at an introduction angle of 45° and 60° respectively. The term center axis refers to the axis which is defined by the main stream direction through the reaction chamber. The product obtained was cooled and separated. Produced carbon black was collected in a filter, while the gas composition was analyzed before being flared off. The carbon black was carefully analyzed by means of several methods, including measuring the BET surface. The results are shown in the following table:

| Plasma gas, Nm³/h | Experiment 1, 45° BET, m2/g | Experiment 2, 60° BET, m²/g |
| --- | --- | --- |
| 6 | 45 | 41 |
| 12 | 56 | 47 |
| 18 | 50 | 56 |
| 24 | — | 50 |

This variation was obtained only by altering the plasma gas rate and angle of introduction of raw material in the reactor. The variation can be attributed to differences in the temperature at which carbon black is actually formed. This means the temperature inside the actual reaction zone 5 in the middle of the reactor and not the wall or outlet temperature. In fact, results were obtained which indicate that one can obtain great variations in the quality of the product merely by altering the angle of introduction of the raw material.

The table further shows that the measured surface area of the product reaches an optimum value when the amount of plasma gas is changed. This is due to the fact that the temperature in the primary reaction zone passes through an optimum, even though the enthalpy and thereby the temperature in the plasma gas is steadily decreasing when the amount of plasma gas increases. The reason for this phenomenon is recirculation streams already reacted and relatively cold material.

FIGS. 2a and 2b illustrate how the temperature in the primary reaction zone 6 passes through an optimum of this kind.

In FIG. 2a the entire reaction zone 5 is located in the plasma gas zone 6 and no recirculated product 7 has been mixed in with it. This is achieved by having sufficient amounts of plasma gas to enable the recirculation zone to be forced away from the reaction zone. The minimum amount of plasma gas which results in no recirculated material being mixed into the reaction zone 5 will give the highest temperature in the reaction zone and thereby a maximum surface area for the product. If the amount of plasma gas increases further the enthalpy in the plasma gas will sink and the temperature in the reaction zone will also drop. The result of this will be a reduction in the surface area of the product. However, the quality of the product will be more homogeneous and uniform than if the temperature in the reaction zone is kept down, since reverse-flowing product is mixed into the reaction zone. In the latter case the temperature gradient in the reaction zone will be greater and the quality dispersal as a consequence of this will also be greater.

FIG. 2b shows how the recirculation stream 6 will lower the temperature in the reaction zone 5, the amount of plasma gas being too small to prevent the material which is flowing back from being mixed into the reaction zone.

The significance of the angle for the quality of the product is closely linked with the explanation given above. If the angle in relation to the center axis is reduced, the reaction zone will be moved further down in the reactor. This results in the necessity of having a larger amount of plasma, and thereby lower enthalpy and temperature, in order to prevent reverse-flowing material from being mixed into the reaction zone, with the resulting drop in temperature.

FIGS. 3A and 3B illustrate a practical embodiment of the device according to the invention for the installation of feed ports 2 which can advantageously be in the shape of nozzles. In this embodiment there is provided a ring element 8 in the top of the reaction zone, perpendicular to the reaction chamber's center axis. In this case the recirculation streams 7 which are indicated in FIG. 2B will only at a maximum reach the ring element 8, in which there are provided nozzles 2, e.g. three symmetrically as indicated in FIG. 3B, where extra feed gases are added. It will be a simple task to incorporate angle adjustment means for the nozzles in a ring element of this kind, e.g., such means being capable of being swivelled up from the ring element to the position 9 indicated by the dotted line and it will also be possible to adjust the nozzles tangentially if this is required. In this way a protected installation of the feed port or nozzles 2 will be obtained, while at the same time simple means are provided for their adjustment. An alternative can be that the nozzles are provided in the space between a ring element 8 and the plasma torch 3, where the nozzles or feed ports are protected against the recirculation stream and where angle adjustments can be more easily performed. The ring element 8 is illustrated as a disc-shaped element, but it can also be an open construction.

A further practical design can consist in a ring element 8 of this kind which is movable in the area of the reaction zone 5, as indicated by arrows P in FIG. 3A. A desired supply of hydrocarbons can thereby be provided to the reaction zone by moving the ring, or providing several rings in this area. The currently preferred design, however, is to provide the ring element 8 on the top of the reaction zone 5. Thus FIG. 3 only illustrates these possibilities in a purely theoretical manner, many variations being possible on the basis of this principle.

In the preceding part it was described how the quality of the produced carbon black can be adjusted by varying the amount of plasma gas and the angle of introduction for the raw material. There is, however, a further parameter which can help to control the quality of the product. This parameter is pressure.

The reaction is normally conducted at a pressure of 1 bar over-pressure. Due to the chemical equilibrium it is desirable to operate the reactor at low pressure. The reaction of methane to hydrogen complies with the equation:

$$CH_4 \rightarrow C + 2H_2$$

Since the reaction leads to an increase in the number of moles, it is advantageous for the degree of conversion of the raw material to have low pressure, and thus the pressure should not be increased too much, since this too is undesirable. A moderate pressure increase by 1–2 bar resulted in the primary particles becoming larger, the measured surface area being reduced and the quality of the product changing in the direction of heavier and softer qualities. With an increase in pressure the quality of the produced carbon also became less dependent on the amount of plasma gas. If, on the other hand, the pressure was reduced, a reduction was obtained in the size of the primary particles and thereby an increase in the measured surface area. The results of experiments in the alteration of pressure are expressed in the following table:

| Plasma gas, Nm3/h | Pressure, bar BET, $m^2/g$ | Pressure, bar BET, $m^2/g$ | Pressure, bar BET, $m^2g$ |
| --- | --- | --- | --- |
| 6 | 65 | — | — |
| 12 | 59 | 45 | 41 |
| 18 | — | 56 | 42 |
| 24 | — | 50 | 37 |

Figure 5:
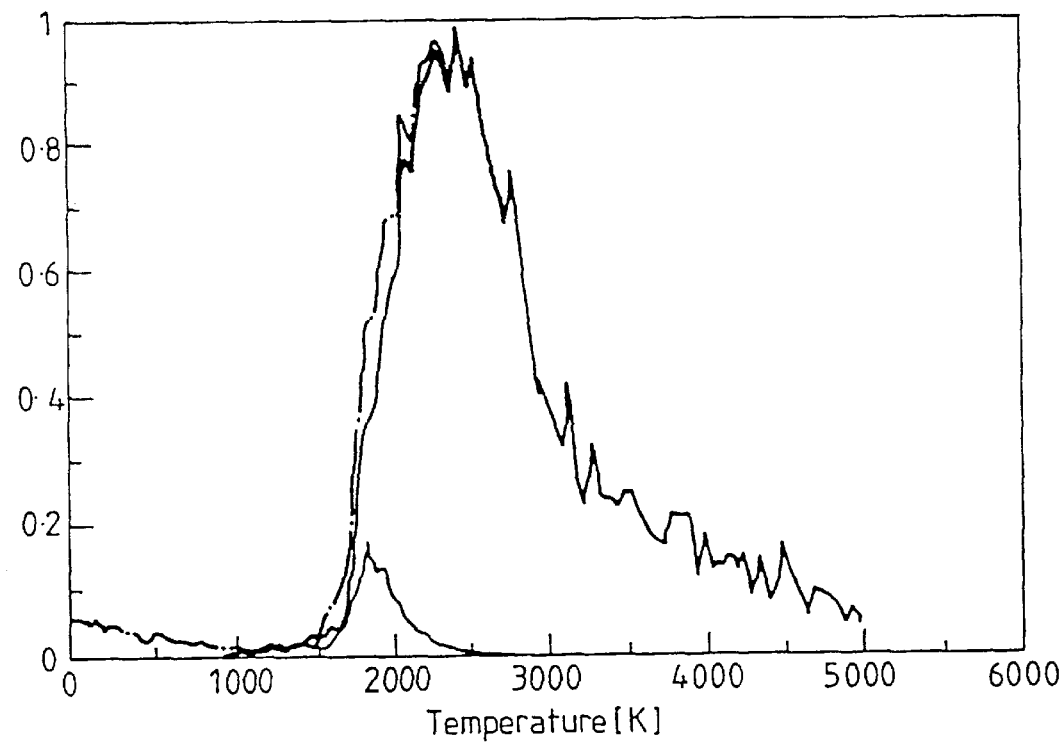
Figure 6:
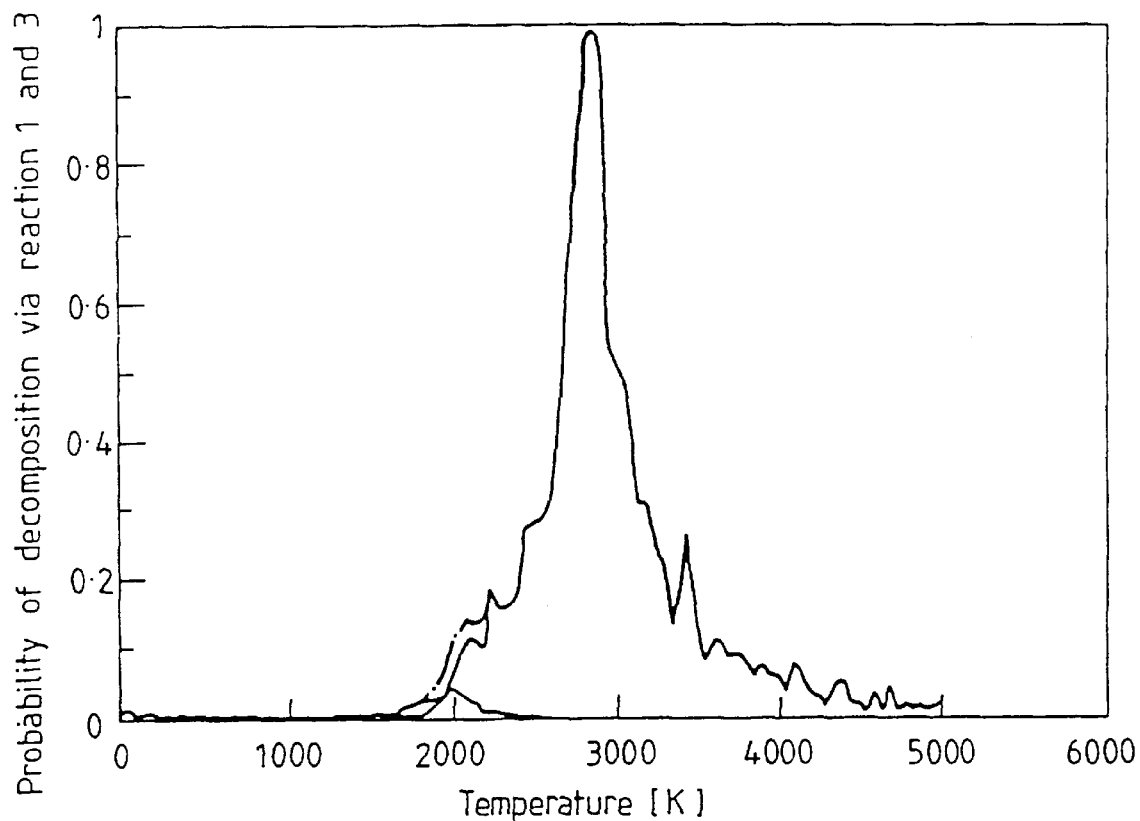

According to the invention a model has been developed for use as an aid in operational planning. FIGS. 4–6 show how it is possible to calculate the quality of the product before the experiment starts. All the figures are calculated three-dimensionally with three injection nozzles for raw material. The figures show how the temperature and the temperature gradient vary in the reaction zone.

FIG. 4 shows how a small angle of introduction and thereby a reaction zone relatively far down in the reactor gives a low reaction zone temperature and a small temperature gradient. This will provide a homogeneous product, but with a relatively small surface area.

FIG. 5 shows how a larger angle of introduction gives a higher reaction zone temperature, but also a larger temperature gradient. This will provide production of a material with a greater average surface area than in FIG. 3, but the product will be less homogeneous.

In FIGS. 4 and 5 radial introduction into the reactor was utilized.

FIG. 6 shows a variant where the reaction temperature is changed if the injection pipes are rotated by 30° in the tangential direction. The rotation which will then occur in the reactor reduces the temperature gradient and increases the average reaction temperature. Thus only small alterations in the angle of introduction in the tangential direction result in the product becoming more homogeneous and obtaining a greater surface area.

The above provides only an example of the principles according to the invention and it should be obvious that many modifications will be possible within the scope of the invention. It will, of course, be possible to use other angles than those indicated and by means of a suitable grouping of parameters it will be possible to obtain the exact product desired for a further refinement process. With regard to the device, this is only illustrated in a purely schematic form, only including only those elements which are of interest for the invention. The design of the rest of the reaction chamber and processing system include elements which can either be generally regarded as belonging to the prior art or are described in the applicant's previous patent application.

We claim:

1. In a device for the production of carbon black and hydrogen by means of pyrolysis of hydrocarbon gases with a plasma torch including a reaction chamber, said plasma torch having at least one end located in said reaction chamber, a hydrocarbon gas injection nozzle positioned to introduce hydrocarbon gas to said plasma torch, said reaction chamber having a center axis and additional injection nozzles for introducing material into the interior of said reaction chamber, the improvement comprising said additional injection nozzles being located at intervals from one another and each being movable along a longitudinal direction of the reaction chamber and being adjustable angularly with respect to the center axis of the reaction chamber at angles between 90° and 30° relative to said center axis, said nozzles also being adjustable in a tangential direction in relation to said center axis of said reaction chamber.

2. The device as claimed in claim 1 wherein said reaction chamber has a reaction zone extending across the center axis of said chamber, a ring being provided about said center axis, said ring carrying nozzles.

3. The device as claimed in claim 1 or 2 wherein said injection nozzles are angularly adjustable in the tangential direction while being also adjustable in relation to the center axis of said reaction chamber.

4. The device as claimed in claim 2 wherein said ring is located at a selected position in said reaction chamber, said plasma torch being disposed on one side of said ring and additional injection nozzles are provided between the location of said plasma torch and said ring.

5. The device as claimed in claim 2 wherein said ring is movable in a direction parallel to the center axis of said reaction chamber.

6. A method for controlling the production of carbon black and hydrogen by means of pyrolysis of hydrocarbons using a plasma torch in a decomposition reactor having a central axis comprising the steps of feeding hydrogen gas to the plasma torch as the plasma gas, providing injection nozzles in the reaction chamber, introducing hydrocarbons through said injection nozzles and adjusting the feed rate of the hydrogen gas and the angle of the injection nozzles in the reaction chamber and the pressure in the reaction chamber to establish a reaction zone in a central area of said chamber, adjusting the enthalpy value in the reaction zone within a range between 1 and 50 kW/Nm$^3$, and thereby maintaining the temperature in the reaction zone between 1000 and 4000° C. and adjusting the pressure in the reaction chamber so that the pressure is between 1 and 3 bar, selecting the feed rate for the hydrogen gas to a value between 6 and 24 Nm$^3$/h and setting the angle of the injection nozzles in the reaction chamber in the range between 60° and 30° in relation to the center axis of the reaction chamber to maintain the reaction zone in said central area of the reaction chamber.

7. The method as claimed in claim 6 further including the steps of, prior to introduction of the hydrocarbons through the injection nozzles to the plasma torch and to the reaction chamber, establishing a model including the parameters of pressure in said reaction chamber, feed rate of the hydrogen gas and angle adjustment of the injection nozzles, varying the parameters to vary the product quality and recording the enthalpy values associated with the different product quality achieved, and using the enthalpy values during the production process to obtain a carbon black product quality corresponding to a selected recorded enthalpy value.

8. The method as claimed in claim 6 wherein the angle of the injection nozzles in the reaction chamber is adjusted within the range of 60° and 45° in relation to the center axis of the reaction chamber.

9. The method as claimed in claims 6 or 8 including the step of adjusting the injection nozzles in the reaction chamber by rotation within an angle between 0° and 45° relative to a radial direction.

* * * * *